(12) United States Patent
Daniels et al.

(10) Patent No.: US 10,640,049 B1
(45) Date of Patent: May 5, 2020

(54) DOCUMENT STORAGE DEVICE

(71) Applicants: Nelson Daniels, Chattanooga, TN (US); Tara Daniels, Chattanooga, TN (US)

(72) Inventors: Nelson Daniels, Chattanooga, TN (US); Tara Daniels, Chattanooga, TN (US)

(*) Notice: Subject to any disclaimer, the term of this patent is extended or adjusted under 35 U.S.C. 154(b) by 0 days.

(21) Appl. No.: 16/168,981

(22) Filed: Oct. 24, 2018

(51) Int. Cl.
*B60R 7/05* (2006.01)
*B60R 11/00* (2006.01)

(52) U.S. Cl.
CPC ............. *B60R 7/05* (2013.01); *B60R 11/00* (2013.01); *A45F 2200/055* (2013.01); *B60R 2011/0035* (2013.01); *B60R 2011/0057* (2013.01); *B60R 2011/0059* (2013.01)

(58) Field of Classification Search
CPC ............... B60R 7/05; B60R 2011/0035; B60R 2011/0057; B60R 2011/0059
USPC .......... 224/312, 277; D12/417, 422; 40/643, 40/591, 592, 593
See application file for complete search history.

(56) References Cited

U.S. PATENT DOCUMENTS

| | | | | |
|---|---|---|---|---|
| 2,382,875 A | * | 8/1945 | Handley | B60J 3/0208 296/97.6 |
| 2,531,295 A | * | 11/1950 | Ritchie | A45C 11/18 40/643 |
| 2,673,670 A | | 3/1954 | Steele | |
| 2,707,072 A | | 4/1955 | Sims | |
| 2,908,434 A | * | 10/1959 | Schnabel | B60R 7/084 224/539 |
| D186,504 S | * | 11/1959 | Chase | D12/417 |
| 3,313,053 A | * | 4/1967 | Vogeli, Sr. | G09F 3/18 40/643 |
| 3,533,178 A | * | 10/1970 | Strohmaier | B60R 13/10 40/643 |
| 4,184,276 A | * | 1/1980 | Hernandez | G09F 1/10 40/593 |
| 4,781,409 A | * | 11/1988 | Harbison | B60J 3/0208 206/0.81 |
| 4,844,311 A | * | 7/1989 | Kalen | B60R 7/05 224/312 |
| D310,602 S | * | 9/1990 | Hatzipanagos | D6/301 |
| D313,695 S | * | 1/1991 | Mawhinney | D12/422 |
| D343,514 S | * | 1/1994 | Underwood, Jr. | D12/191 |
| 5,330,085 A | * | 7/1994 | Horensky | B60R 7/05 224/277 |
| 5,351,813 A | | 10/1994 | Golovan | |
| D358,253 S | * | 5/1995 | Wong | D3/247 |
| 5,502,912 A | | 4/1996 | LeBoff | |

(Continued)

*Primary Examiner* — Justin M Larson

(57) ABSTRACT

A document storage device for staging documents for presentation to a law enforcement officer includes a first panel and a plurality of second panels. A first coupler is coupled to a back of the first panel and is configured to selectively and removably couple the first panel to a surface of a vehicle, such as a visor and a window edge. Each second panel has opposing edges and a bottom edge that are coupled to a front of the first panel to define a plurality of pouches. A top of each pouch is configured to insert a respective document, such as a driver's license, proof-of-insurance, vehicle registration, and other permits, into the pouch. The pouch is readily repositioned from the visor of the vehicle to an edge of the driver's window in event the driver is pulled over by the law enforcement officer.

15 Claims, 4 Drawing Sheets

(56) References Cited

U.S. PATENT DOCUMENTS

| | | | |
|---|---|---|---|
| 5,813,539 A * | 9/1998 | DePalma | G09D 3/04 |
| | | | 206/459.1 |
| 5,887,773 A * | 3/1999 | Booth | B60R 11/02 |
| | | | 224/277 |
| D413,148 S * | 8/1999 | Ferguson | D12/191 |
| D460,119 S * | 7/2002 | Tomai | D20/40 |
| 6,446,374 B1 * | 9/2002 | Ardiff | G09F 3/20 |
| | | | 40/591 |
| D479,503 S * | 9/2003 | Robinson | D12/417 |
| 6,694,650 B2 * | 2/2004 | Brown | G09F 1/10 |
| | | | 40/124.2 |
| D567,741 S * | 4/2008 | Chalek | D12/417 |
| D706,539 S * | 6/2014 | Hondos | D3/303 |
| 8,739,442 B2 * | 6/2014 | Shape | A47G 1/0616 |
| | | | 224/312 |
| D710,105 S * | 8/2014 | Hondos | D3/303 |
| D713,643 S * | 9/2014 | Adinolfe, Sr. | D3/303 |
| D764,800 S | 8/2016 | Juniper | |
| 9,472,127 B2 * | 10/2016 | Tatum | G09F 7/08 |
| 10,005,400 B1 * | 6/2018 | Clark | B60R 7/082 |
| 2004/0108228 A1 * | 6/2004 | Rall | B42D 5/006 |
| | | | 206/215 |
| 2005/0198882 A1 * | 9/2005 | Zaremba | A47G 1/06 |
| | | | 40/654.01 |
| 2007/0235484 A1 | 10/2007 | Staniszewski | |
| 2017/0166136 A1 | 6/2017 | Jones | |

\* cited by examiner

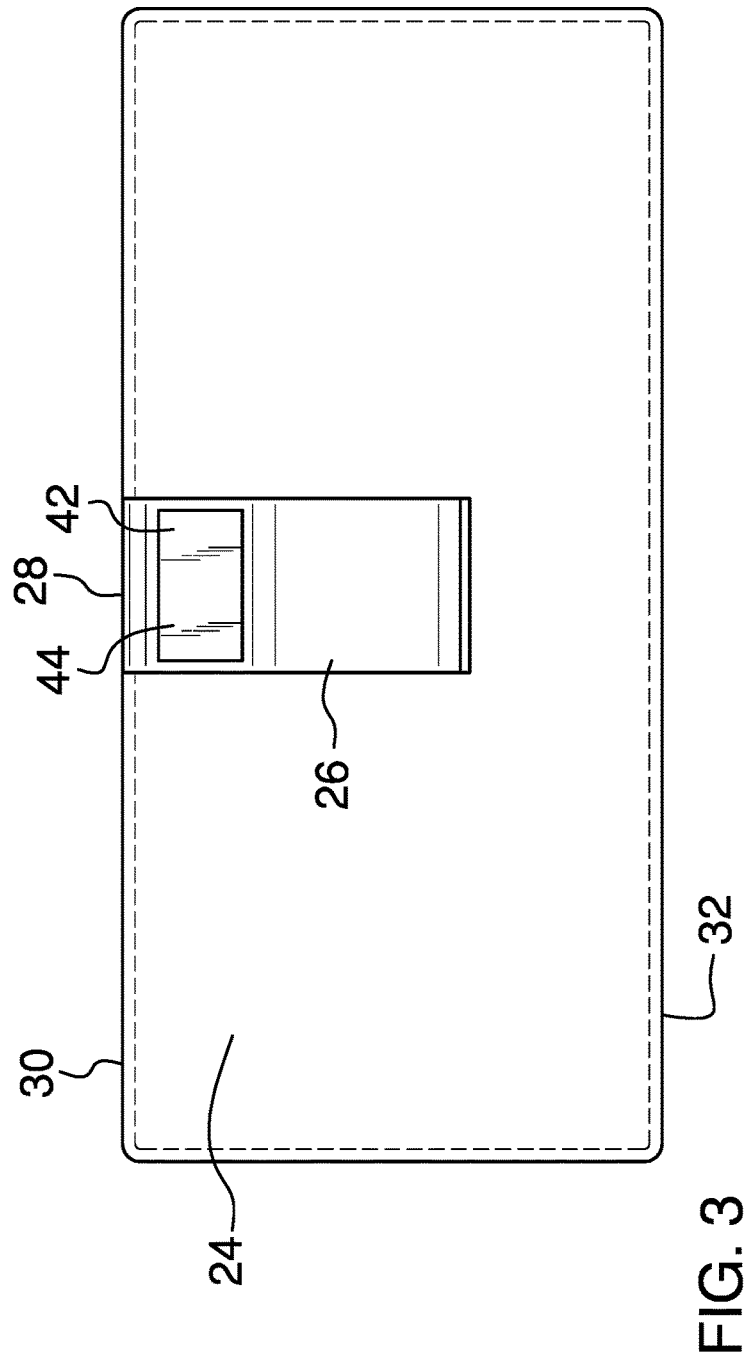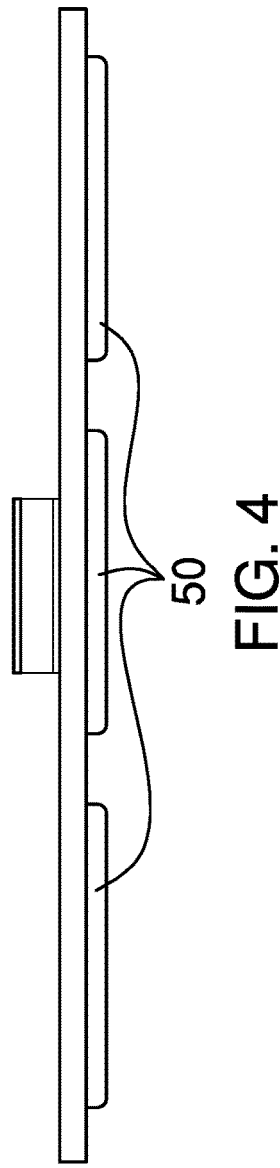

DOCUMENT STORAGE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to storage devices and more particularly pertains to a new storage device for staging documents for presentation to a law enforcement officer.

BRIEF SUMMARY OF THE INVENTION

An embodiment of the disclosure meets the needs presented above by generally comprising includes a first panel and a plurality of second panels. A first coupler is coupled to a back of the first panel and is configured to selectively and removably couple the first panel to a surface of a vehicle, such as a visor and a window edge. Each second panel has opposing edges and a bottom edge that are coupled to a front of the first panel to define a plurality of pouches. A top of each pouch is configured to insert a respective document, such as a driver's license, proof-of-insurance, vehicle registration, and other permits, into the pouch. The pouch is readily repositioned from the visor of the vehicle to an edge of the driver's window in event the driver is pulled over by a law enforcement officer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a back view of an embodiment of the disclosure.

FIG. 4 is a bottom view of an embodiment of the disclosure.

DETAILED DESCRIPTION OF THE INVENTION

Figure 1:
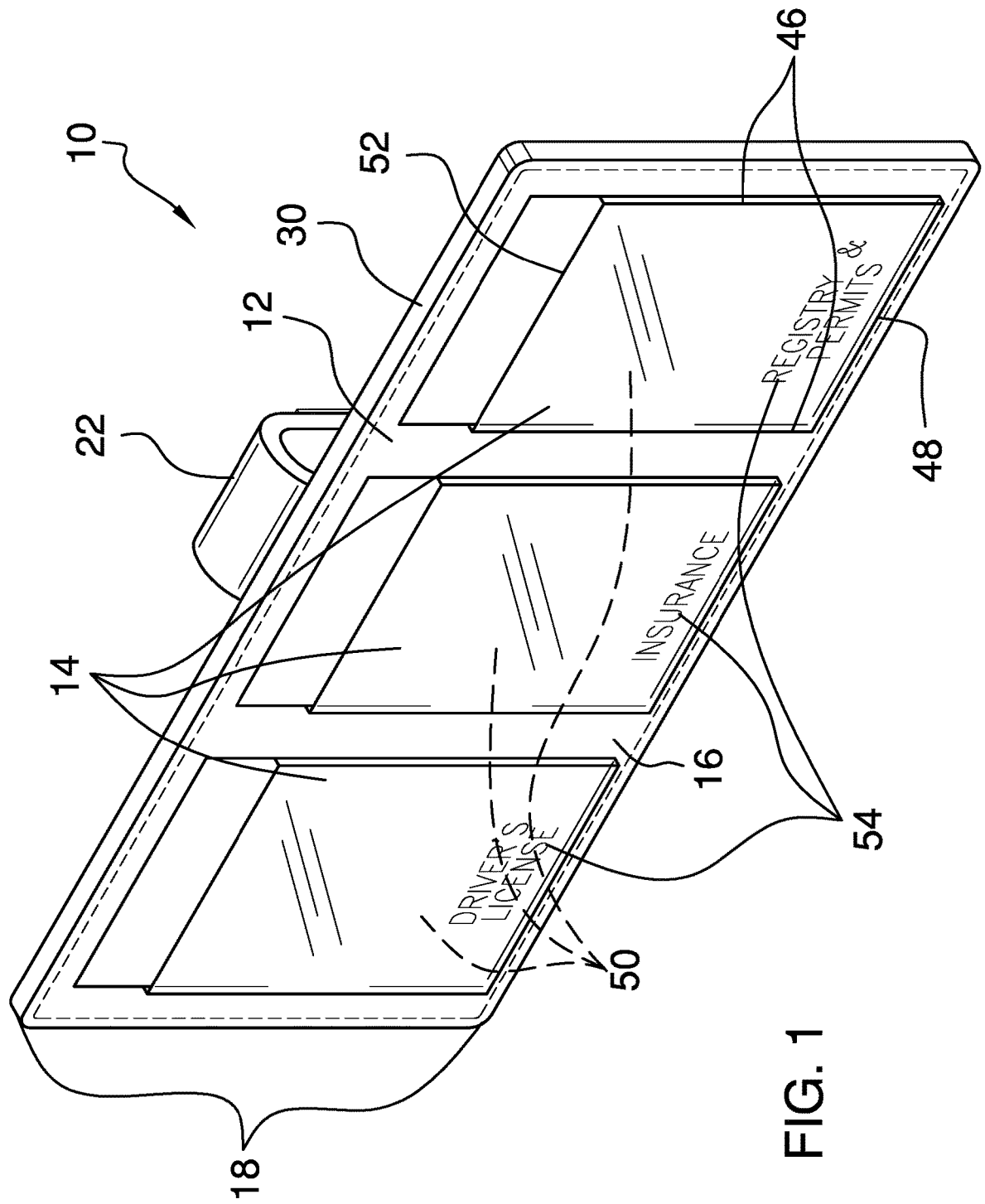
FIG. 1 is an isometric perspective view of a document storage device according to an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the document storage device 10 generally comprises a first panel 12 and a plurality of second panels 14. The first panel 12 is rigid so that the first panel 12 retains a substantially planar configuration when a front 16 of the first panel 12 is positioned horizontally. The first panel 12 comprises cardboard. The first panel 12 is substantially rectangularly shaped to define corners 18 of the first panel 12. The corners 18 are arcuate so that the corners 18 are configured to slide over surfaces of a vehicle.

Figure 5:
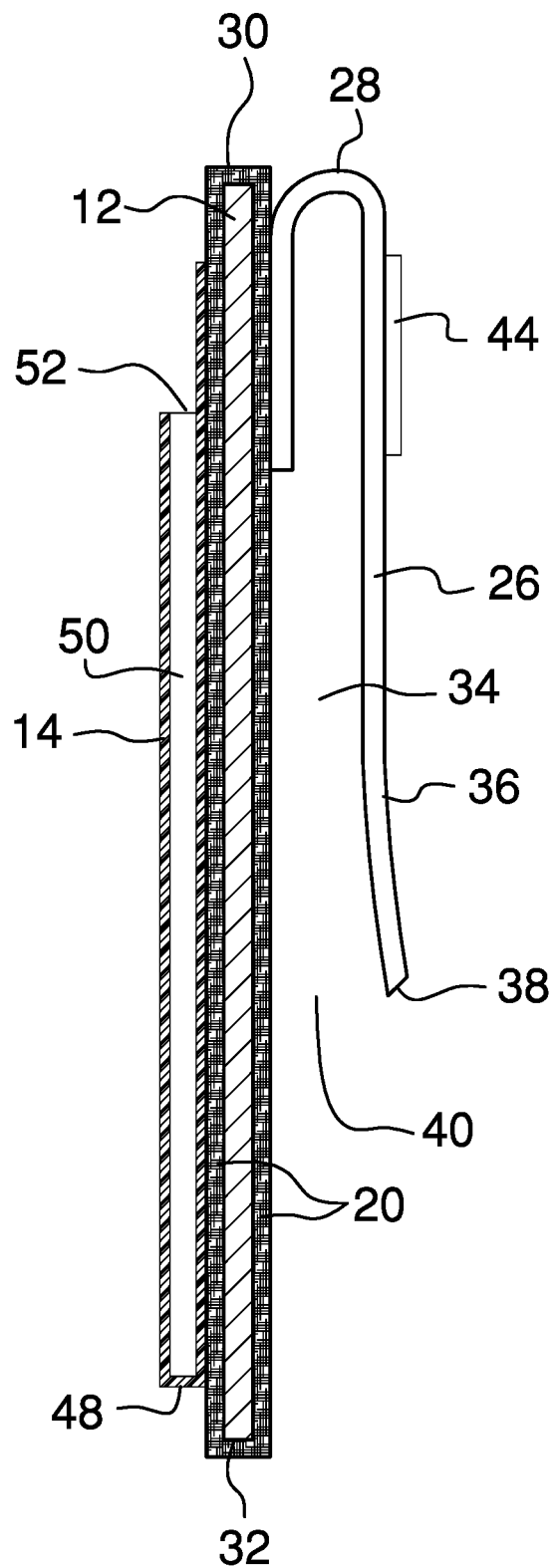
FIG. 5 is a cross-sectional view of an embodiment of the disclosure.

A shell 20 is positioned over and is coupled to the first panel 12, as shown in FIG. 5. The shell 20 is positioned to shield the first panel 12 from soiling and moisture. The shell 20 comprises at least one of fabric and leather.

A first coupler 22 is coupled to a back 24 of the first panel 12 and is configured to selectively and removably couple the first panel 12 to a surface of a vehicle, such as a visor and a window edge. The first coupler 22 comprises a clip 26 that has a first end 28 which is coupled to the back 24 of the first panel 12 proximate to a top 30 of the first panel 12. The clip 26 extends substantially parallelly to the back 24 of the first panel 12 toward a bottom 32 of the first panel 12 so that the clip 26 and the first panel 12 define a slot 34, as shown in FIG. 5. The clip 26 is resiliently deformable so that the clip 26 is configured to insert the visor into the slot 34 and to rebound to frictionally couple the first panel 12 to the visor.

The first end 28 of the clip 26 extends past the top 30 of the first panel 12 so that the visor overlays the back 24 of the first panel 12 when the visor is fully inserted into the slot 34. The clip 26 has a bend 36 that is positioned proximate to a second end 38 of the clip 26 so that the clip 26 extends distally from the back 24 of the first panel 12 proximate to the second end 38. The slot 34 thus is wider proximate to the second end 38, as shown in FIG. 5. An opening 40 of the slot 34 is substantially complementary to a thickness of the visor and is configured to insert the visor into the slot 34, as shown in FIG. 2.

A second coupler 42 is coupled to the back 24 of the first panel 12. The second coupler 42 is configured to selectively and removably couple the first panel 12 to an exterior metallic surface of the vehicle, such as the exterior of the driver's door. The second coupler 42 comprises a plurality of magnets 44 that is coupled to the back 24 of the first panel 12. The magnets 44 are configured to magnetically couple to the exterior metallic surface of the vehicle to couple the first panel 12 to the exterior metallic surface. The plurality of magnets 44 comprises a magnet 44 that is coupled to the clip 26, as shown in FIG. 3.

Figure 2:
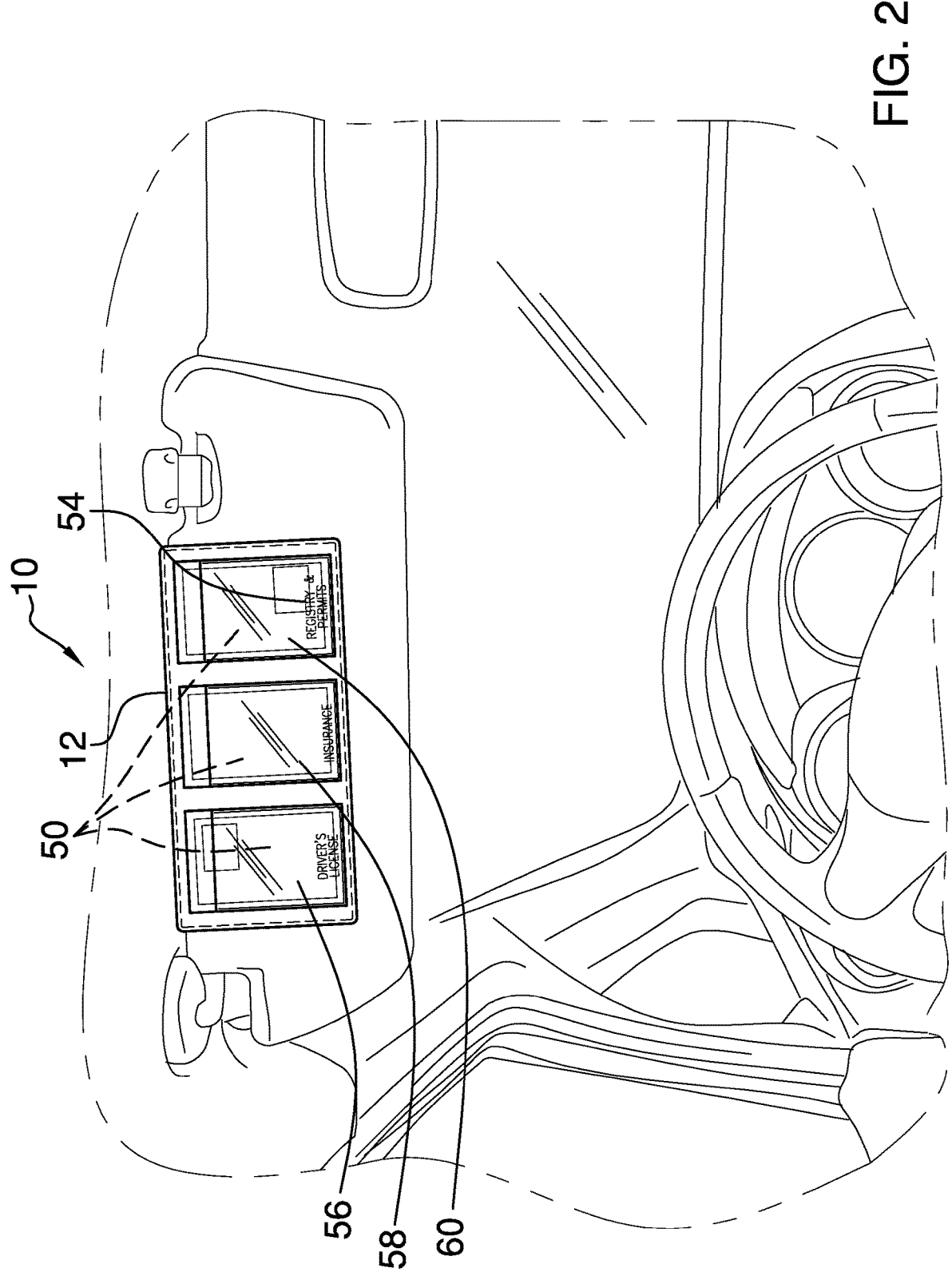
FIG. 2 is an in-use view of an embodiment of the disclosure.

Each of the second panels 14 has opposing edges 46 and a bottom edge 48 that are coupled to the front 16 of the first panel 12 to define a plurality of pouches 50, as shown in FIG. 2. An upper end 52 of each pouch 50 is configured to insert a respective document, such as a driver's license, proof-of-insurance, vehicle registration, and other permits, into the pouch. The second panel 14 is substantially transparent so that the second panel 14 is configured to view the respective document within an associated pouch 50 without removing the respective document from the associated pouch 50. The second panels 14 are substantially rectangularly shaped. The plurality of second panels 14 comprises three second panels 14, as shown in FIG. 2.

Indicia 54 are coupled to the plurality of second panels 14. The indicia 54 are configured to identify the respective documents that are positioned in the pouches 50. The indicia 54 comprise "DRIVER'S LICENSE" that is positioned on a third panel 56, "INSURANCE" that is positioned on a fourth panel 58, and "REGISTRY & PERMITS" that is positioned on a fifth panel 60, as shown in FIG. 1. The fifth panel 60 is intended identify a respective pouch 50 that is used to stow the vehicle registration along with any concealed carry permits possessed by the driver.

In use, the respective documents are stowed in the pouches 50 and the clip 26 is used to couple the first panel 12 to the visor of the vehicle. Should the driver be stopped by the law enforcement officer, the first panel 12 is readily movable from the visor to a location easily viewed by the law enforcement officer. The first panel 12 can be moved while the law enforcement officer approaches the vehicle, either to the edge of the driver's window using the clip 26, or to the exterior of the driver's door using the magnet 44. Presenting the respective documents in this manner reduces tension for both the driver and the law enforcement officer as the driver need not search for the respective documents and can remain still, and attentive to the commands of the law enforcement officer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A document storage device comprising:
   a first panel;
   a first coupler coupled to a back of the first panel, the first coupler being configured for selectively removably coupling the first panel to a surface of a vehicle, the first coupler comprising a clip having a first end coupled to the back of the first panel proximate to a top of the first panel, the clip extending substantially parallelly to the back of the first panel toward a bottom of the first panel such that the clip and the first panel define a slot, the clip being resiliently deformable such that the clip is configured for inserting the visor into the slot and for rebounding for frictionally coupling the first panel to the visor;
   a plurality of second panels, each second panel having opposing edges and a bottom edge coupled to a front of the first panel defining a plurality of pouches wherein an upper end of each pouch is configured for inserting a respective document into the pouch;
   a second coupler coupled to the back of the first panel, the second coupler comprising a magnet coupled to the clip such that the magnet is facing away from the first panel and positioned parallel to the first panel when the clip is in a non-deformed state wherein the magnet is configured for magnetically coupling to the exterior metallic surface of the vehicle for coupling the first panel to the exterior metallic surface.

2. The device of claim 1, further including the first panel being rigid such that the first panel retains a substantially planar configuration when the front of the first panel is positioned horizontally.

3. The device of claim 2, further including the first panel comprising cardboard.

4. The device of claim 1, further including the first panel being substantially rectangularly shaped defining corners of the first panel.

5. The device of claim 4, further including the corners being arcuate such that the corners are configured for sliding over surfaces of a vehicle.

6. The device of claim 1, further including a shell positioned over and coupled to the first panel wherein the shell is positioned for shielding the first panel from soiling and moisture.

7. The device of claim 6, further including the shell comprising at least one of fabric and leather.

8. The device of claim 1, further including the first end of the clip extending past the top of the first panel such that the visor overlays the back of the first panel when the visor is fully inserted into the slot.

9. The device of claim 1, further including the clip having a bend positioned proximate to a second end of the clip such that the clip extends distally from the back of the first panel proximate to the second end such that the slot is wider proximate to the second end such that an opening of the slot is substantially complementary to a thickness of the visor wherein the opening is configured for inserting the visor into the slot.

10. The device of claim 1, further including the second panel being substantially transparent such that the second panel is configured for viewing the respective document within an associated pouch.

11. The device of claim 1, further including the second panels being substantially rectangularly shaped.

12. The device of claim 1, further including the plurality of second panels comprising three second panels.

13. The device of claim 1, further including indicia coupled to the plurality of second panels wherein the indicia are configured for identifying the respective documents positioned in the pouches.

14. The device of claim 13, further including the indicia comprising "DRIVER'S LICENSE" positioned on a third panel, "INSURANCE" positioned on a fourth panel, and "REGISTRY & PERMITS" positioned on a fifth panel.

15. A document storage device comprising:
- a first panel, the first panel being rigid such that the first panel retains a substantially planar configuration when a front of the first panel is positioned horizontally, the first panel comprising cardboard, the first panel being substantially rectangularly shaped defining corners of the first panel, the corners being arcuate such that the corners are configured for sliding over surfaces of a vehicle;
- a shell positioned over and coupled to the first panel wherein the shell is positioned for shielding the first panel from soiling and moisture, the shell comprising at least one of fabric and leather;
- a first coupler coupled to a back of the first panel, the first coupler being configured for selectively removably coupling the first panel to a surface of a vehicle, the first coupler comprising a clip having a first end coupled to the back of the first panel proximate to a top of the first panel, the clip extending substantially parallelly to the back of the first panel toward a bottom of the first panel such that the clip and the first panel define a slot, the clip being resiliently deformable such that the clip is configured for inserting the visor into the slot and for rebounding for frictionally coupling the first panel to the visor, the first end of the clip extending past the top of the first panel such that the visor overlays the back of the first panel when the visor is fully inserted into the slot, the clip having a bend positioned proximate to a second end of the clip such that the clip extends distally from the back of the first panel proximate to the second end such that the slot is wider proximate to the second end such that an opening of the slot is substantially complementary to a thickness of the visor wherein the opening is configured for inserting the visor into the slot;
- a second coupler, the second coupler being a magnet coupled to the clip such that the magnet is facing away from the first panel and positioned parallel to the first panel when the clip is in a non-deformed state wherein the magnet is configured for magnetically coupling to the exterior metallic surface of the vehicle for coupling the first panel to the exterior metallic surface;
- a plurality of second panels, each second panel having opposing edges and a bottom edge coupled to the front of the first panel defining a plurality of pouches wherein an upper end of each pouch is configured for inserting a respective document into the pouch, the second panel being substantially transparent such that the second panel is configured for viewing the respective document within an associated pouch, the second panels being substantially rectangularly shaped, the plurality of second panels comprising three second panels; and
- indicia coupled to the plurality of second panels wherein the indicia are configured for identifying the respective documents positioned in the pouches, the indicia comprising "DRIVER'S LICENSE" positioned on a third panel, "INSURANCE" positioned on a fourth panel, and "REGISTRY & PERMITS" positioned on a fifth panel.

* * * * *